United States Patent [19]

Pinder et al.

[11] Patent Number: 5,684,876
[45] Date of Patent: Nov. 4, 1997

[54] APPARATUS AND METHOD FOR CIPHER STEALING WHEN ENCRYPTING MPEG TRANSPORT PACKETS

[75] Inventors: Howard George Pinder; Michael Steven Palgon, both of Atlanta, Ga.

[73] Assignee: Scientific-Atlanta, Inc., Norcross, Ga.

[21] Appl. No.: 710,842

[22] Filed: Sep. 23, 1996

Related U.S. Application Data

[60] Provisional application No. 60/006,791 Nov. 15, 1995.
[51] Int. Cl.$^6$ .................................................. H04L 9/18
[52] U.S. Cl. ............................... 380/37; 380/42; 380/49
[58] Field of Search .............................. 380/37, 42, 49

[56] References Cited

U.S. PATENT DOCUMENTS

| | | |
|---|---|---|
| 3,798,360 | 3/1974 | Feistel . |
| 3,956,615 | 5/1976 | Anderson et al. . |
| 4,078,152 | 3/1978 | Tuckerman, III . |
| 4,229,818 | 10/1980 | Matyas et al. . |
| 4,679,081 | 7/1987 | Tsugane et al. . |
| 4,710,957 | 12/1987 | Bocci et al. ............................ 380/42 |
| 4,924,515 | 5/1990 | Matyas et al. . |
| 5,103,478 | 4/1992 | Matyas et al. . |
| 5,161,193 | 11/1992 | Lampson et al. . |
| 5,235,644 | 8/1993 | Gupta et al. . |
| 5,268,908 | 12/1993 | Glover et al. . |
| 5,412,729 | 5/1995 | Liu ........................................ 380/37 |

OTHER PUBLICATIONS

Carl H. Meyer et al. "Cryptography: A New Dimension In Computer Data Security", *John Wiley & Sons* 1982, pp. 74–85.

*Primary Examiner*—Salvatore Cangialosi
*Attorney, Agent, or Firm*—Banner & Witcoff, Ltd.

[57] ABSTRACT

A method of encrypting clear payload data to form encrypted payload data uses a block cipher, the block cipher being characterized by a predetermined block length. The method includes a step of parsing and first and second steps of encrypting. The step of parsing parses the clear payload data into at least one full clear block and a residual block, the at least one full clear block including a last full clear block. Each full clear block is characterized by the predetermined block length. The residual block is characterized by a residual block length, the residual block length being less than the predetermined block length. The step of parsing further parses the last full clear block into a first part and a second part, the second part being characterized by a length equaling a difference between the predetermined block length and the residual block length. The first step of encrypting encrypts a combination of the second part and the residual block to form a first encrypted block, the first encrypted block having a third part and a fourth part. The third part is characterized by a length equaling the second part length. The second step of encrypting encrypts a combination of the first part and the third part to form a second encrypted block, and it is the combination of the second encrypted block and the fourth part that forms the encrypted payload data.

8 Claims, 5 Drawing Sheets

APPARATUS AND METHOD FOR CIPHER STEALING WHEN ENCRYPTING MPEG TRANSPORT PACKETS

BACKGROUND OF THE INVENTION

Benefit of the Nov. 15, 1995 priority date of provisional application 60/006,791, now abandoned, is hereby claimed.

1. Field of the Invention

This invention relates to a method and apparatus for encrypting multiplex data stream transport packets under MPEG 2 (Motion Picture Experts Group version 2) standards, and more specifically to a technique for encrypting an MPEG 2 payload where the size of the payload may not be necessarily be an integer multiple of a DES encryption algorithm block size.

2. Description of Related Art

MPEG 2 transport packets are transmitted in groups of data bytes, generally referred to as a payload. Methods for encryption of the MPEG 2 standard transport packet were not defined in the MPEG standard, but a common approach for encrypting the transport packet is to use a block cipher technique to perform that function, for example, the Data Encryption Standard (DES). The Block cipher technique requires that a certain number of data bytes, referred to as a block, be encrypted at the same time. A typical block size is eight bytes (64 bits). The current state of the art limits the number of bytes of an MPEG 2 payload to be encrypted to an integer multiple of the block size.

Other techniques for solving the payload size problem is to use a stream cipher approach. The stream cipher approach has no block constraints. A further approach is to use a combination of stream cipher and block cipher techniques, and only the stream cipher would encrypt the residue remaining after the last full block is encrypted.

It is desired to use a block cipher method to solve the payload size problem. Block ciphers can be easily implemented in high-speed hardware. Block ciphers also provide the advantage that each output bit is dependent upon each key bit and each input bit of the block. Each output bit from a stream cipher, depends on the key bits and only the preceding input bit.

U.S. Pat. No. 4,078,152 to Tuckerman, III describes a block cipher system with chaining in which a plain text block before encipherment is combined in an invertible way with the preceding cipher text block. Tuckerman, III does not address problems of encrypting partial blocks using block ciphers.

Information for handling partial blocks of data is described in Cryptography: A New Dimension in Computer Data Security, by Carl H. Meyer and Stephen M. Matyas on pages 73–85. FIGS. 6 and 7 illustrate a known method of encryption and decryption, respectively, of information having a data length unequal to an integral multiple of the encryption block length. For illustration purposes, a Data Encryption Standard (DES) Electronic Code Book (ECB) mode will be assumed.

In FIG. 6, the last complete block of a clear message is first encrypted, but only the first part of the first encrypted block is placed in the output buffer. The second part of the first encrypted block is concatinated with the residual block and passed through a second encryption to be placed in the output buffer. The concatination of the second part of the first encrypted block with the residual block produces a block of length equal to the cipher block length of the DES-ECB encryptor.

In FIG. 7, the first part of the last complete block of encrypted information is temporarily stored while the second part of the last complete block of encrypted information is concatinated with the residual block and processed through a first decryption. The first part of the last complete block of encrypted information is retrieved from temporary storage, concatinated with a first part of the first decryption result, and processed through a second decryption while a second part of the first decryption result is temporarily stored. The second decryption result is placed in the output buffer and then the second part of the first decryption result is retrieved from the temporary storage and placed in the output buffer.

SUMMARY OF THE INVENTION

It is an object to the present invention to provide a method to encrypt clear payload data in a transport stream using a block cipher when the clear payload data length is not an integer multiple of the cipher block length. It is a further object of the present invention to provide a method to decrypt encrypted payload data in a transport stream using a block cipher when the encrypted payload data length is not an integer multiple of the cipher block length. It is yet another object of the present invention to provided an encryption and corresponding decryption process where the need for temporary storage of intermediary results is move the the decoder to the encoder since there is usually only one encoder for many decoders.

These and other objects are achieved using a method of encrypting clear payload data to form encrypted payload data uses a block cipher, the block cipher being characterized by a predetermined block length. The method includes a step of parsing and first and second steps of encrypting. The step of parsing parses the clear payload data into at least one full clear block and a residual block, the at least one full clear block including a last full clear block. Each full clear block is characterized by the predetermined block length. The residual block is characterized by a residual block length, the residual block length being less than the predetermined block length. The step of parsing further parses the last full clear block into a first part and a second part, the second part being characterized by a length equaling a difference between the predetermined block length and the residual block length. The first step of encrypting encrypts a combination of the second part and the residual block to form a first encrypted block, the first encrypted block having a third part and a fourth part. The third part is characterized by a length equaling the second part length. The second step of encrypting encrypts a combination of the first part and the third part to form a second encrypted block, and it is the combination of the second encrypted block and the fourth part that forms the encrypted payload data.

These and other objects are achieved using a method of decrypting encrypted payload data to recover clear payload data uses a block cipher, the block cipher being characterized by a predetermined block length. The method includes a step of parsing and first and second steps of decrypting. The step of parsing parses the encrypted payload data into a last full encrypted block and a remaining block, the last full encrypted block being characterized by the predetermined block length, the remaining block being characterized by a remaining block length, the remaining block length being less than the predetermined block length. The first step of decrypting decrypts the last full encrypted block to form a last full decrypted block, the last full decrypted block having a first part and a second part, the second part being characterized by a length equaling a difference between the predetermined block length and the remaining block length. The second step of decrypting decrypts a combination of the second part and the remaining block to form a second decrypted block, an it is the combination of the first part and the second decrypted block that forms the recovered clear payload data.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 5:
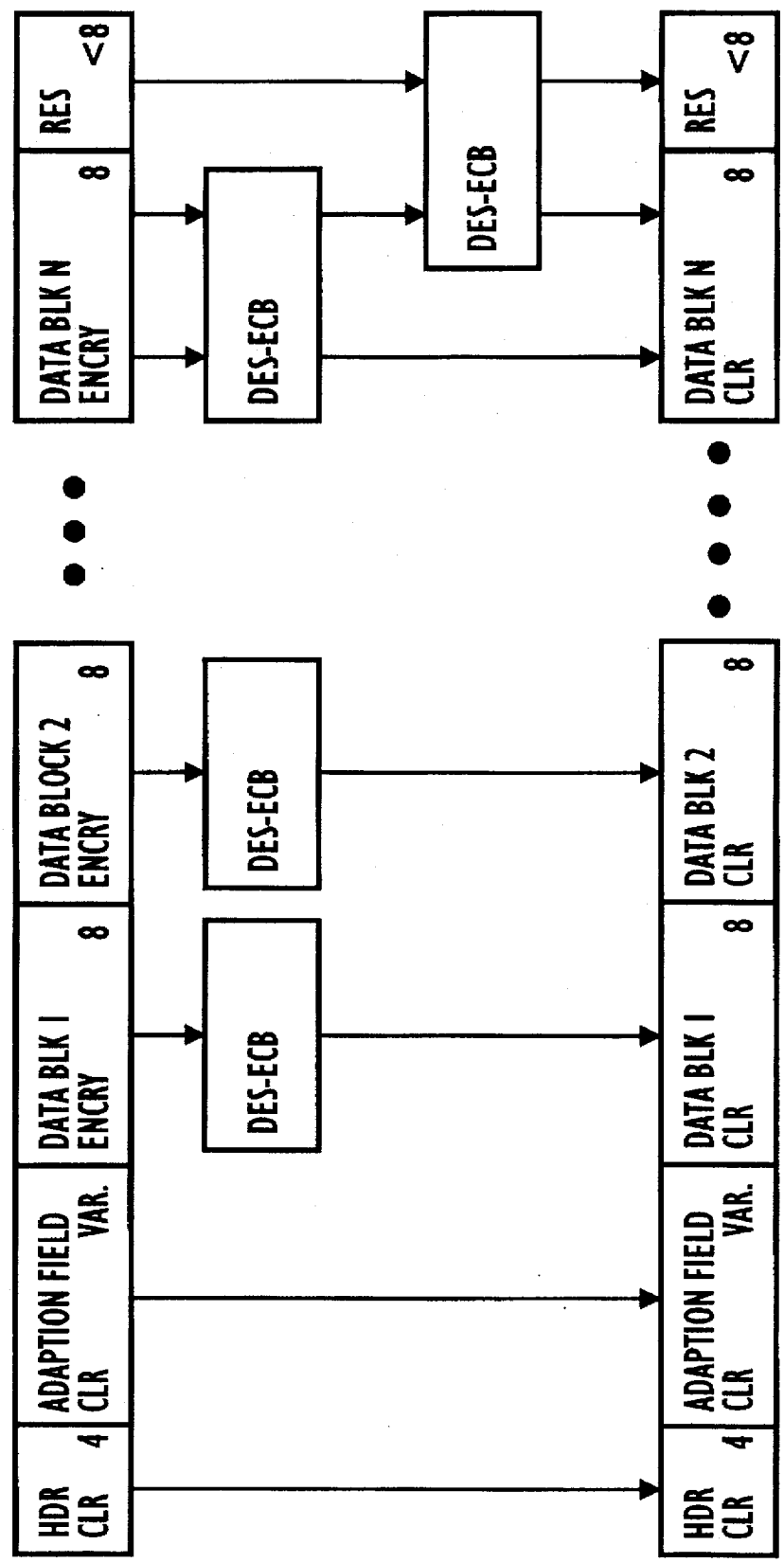
FIG. 5 is a block diagram of a method of decrypting a complete transport packet according to the present invention.
Figure 7:
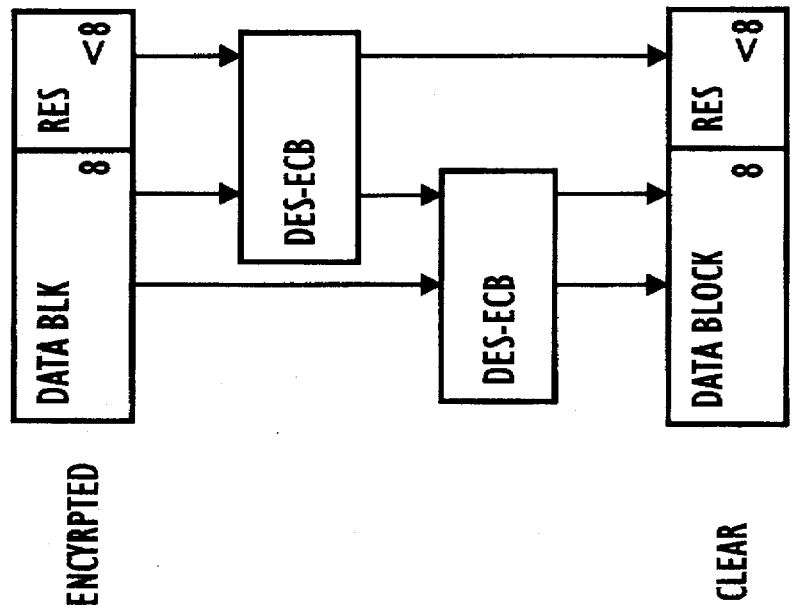
FIG. 7 is a block diagram of a known method of decryption.
Figure 6:
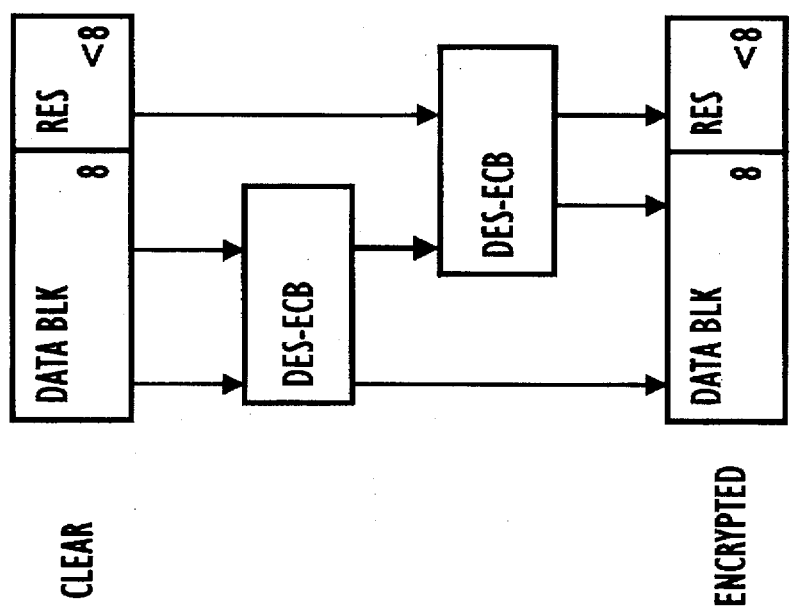
FIG. 6 is a block diagram of a known method of encryption.

In FIG. 5, header data and adaption field data is transported in a data stream in the clear (i.e, unencrypted). The header data is of a fixed length; however, the adaption field data, which may contain for example conditional access data, is of a variable length. This variable length gives rise to a variable length residual block of data. After the adaption field, is a number of fixed length encrypted blocks of data followed by an encrypted residual block of data. The fixed length blocks of data, except for the last complete fixed length block of data, are decrypted in a simple block decryptor. The last complete encrypted block of data and the encrypted residual block of data is decrypted in a compound decryption process further described with respect to FIG. 2.

In a preferred embodiment, the payload size constraints (i.e., integer multiples of the cipher block length) is removed by applying a cipher stealing method. By using this method, the payload size can be arbitrary (up to the limits of an MPEG transport packet). If the payload size is not a multiple of the block size, previously encrypted bytes are "stolen" from the last block, to form a full block. Preferably this method is implemented using an encryption scheme generally referred to as the Data Encryption Standard (DES), which has a block size of 8 bytes. This method could also be used for triple DES, which has an 8-byte block size as well, or block sizes larger or smaller than 8 bytes. It will be appreciated that an 8-byte block has a block length of 64 bits, since a byte customarily contains 8 bits.

Encryption is performed on payload data only. The adaption field in the MPEG standard format is not encrypted. The number of payload bytes, n, can typically range from 0 to 184. When n is 8 or more, data encryption is described as follows. For a payload n of less than 8, the payload data bytes are preferably not encrypted.

The method of this invention is referred to as cipher-text stealing because data from the last full block are added to any partial block remaining. The result of this encryption technique is that some data bytes get encrypted twice, thereby necessitating non-sequential operations during encryption.

The Transport Stream packet header (for example, of the MPEG 2 format), including the adaptation field when present, is not encrypted. However, the packet payload is encrypted using a block encryption algorithm, starting with the first B bytes of payload data, where B is the block size of the algorithm. In the event the number of bytes in the payload is not an integer multiple of the encryption block size, the method of cipher stealing described herein is used for encryption of the left-over bytes.

Figure 1:
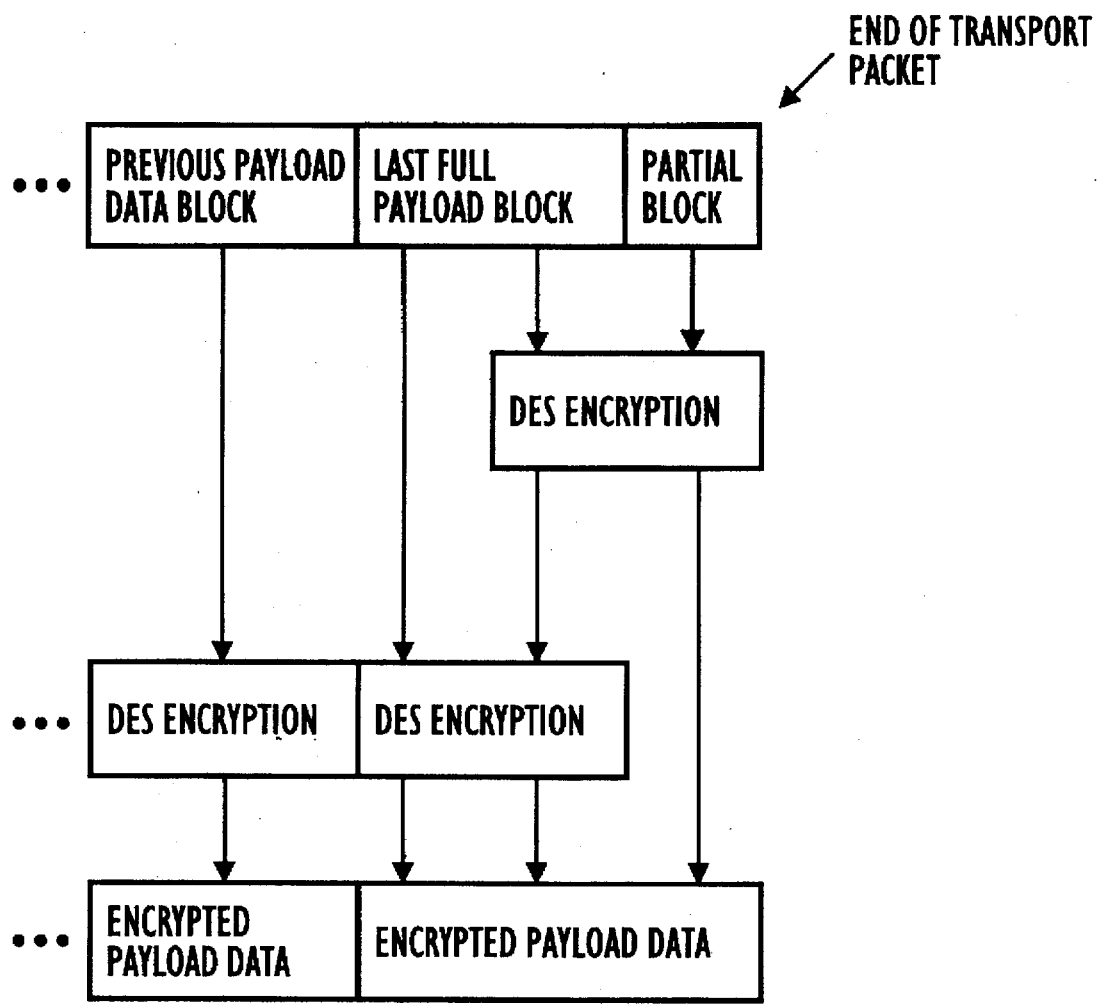
FIG. 1 is a block diagram of a method of payload encryption using a cipher-text stealing approach.
Figure 2:
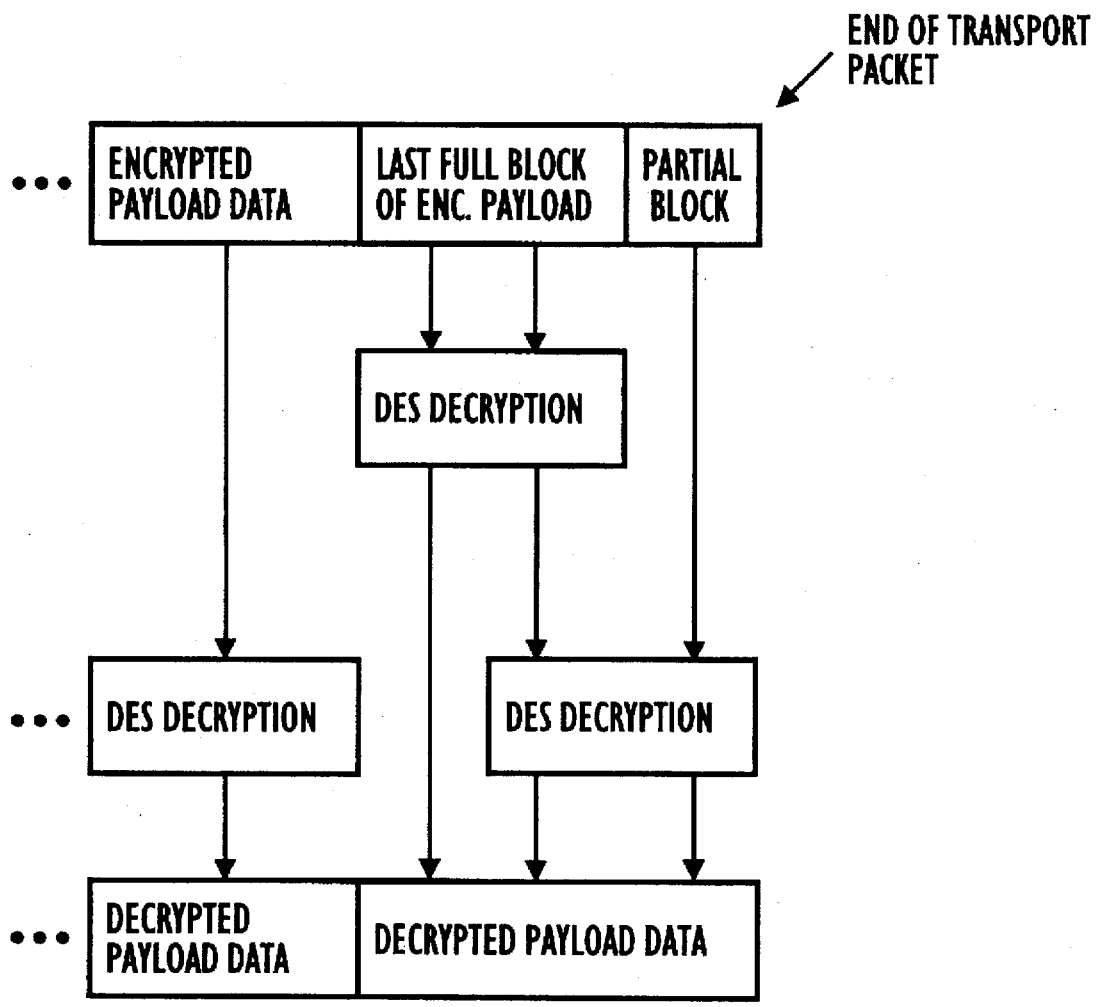
FIG. 2 is a block diagram of a method of payload decryption using a cipher-text stealing approach.

Assume the number of bytes remaining after all full blocks of data is P where P is unequal to and less than B (the full block length). Prior to encryption of the last full block of data, the left-over bytes are combined with the last (B-P) bytes from the last full block, and this combination is then encrypted in a first encryption. The last P bytes from this first encryption are to be the last P bytes of the encrypted packet. The first (B-P) bytes from the results of this first encryption are joined with the first P bytes of the last full block, and this combination is then encrypted in a second encryption, the result becoming the last full encrypted block in the encrypted packet. Decryption of the packet is the reverse process. FIG. 1 shows the encryption process, and FIG. 2 shows the corresponding decryption process.

In a exemplary system, payload data is encrypted 8 bytes at a time, starting with the first payload byte. At the end of the packet, if any partial block remains of length P, 8−P bytes of data is taken from the previous block to form a complete block and then encrypted. The last P bytes of the results of this first encryption become the last P bytes of the encrypted packet. The first 8−P bytes of the results of the first encryption are combined with the first P bytes from the last full block, and this combination is then encrypted in a second encryption. The results of this second encryption forms the last full block of the encrypted payload.

If the payload is an exact multiple of the block size, no cipher stealing is required. In which case the encryption method ends with the last full block of data. All DES encryption preferably use an electronic codebook mode with the current DES key. Preferably, there is no chaining between blocks, and the DES key remains constant over the entire transport packet.

Figure 3:
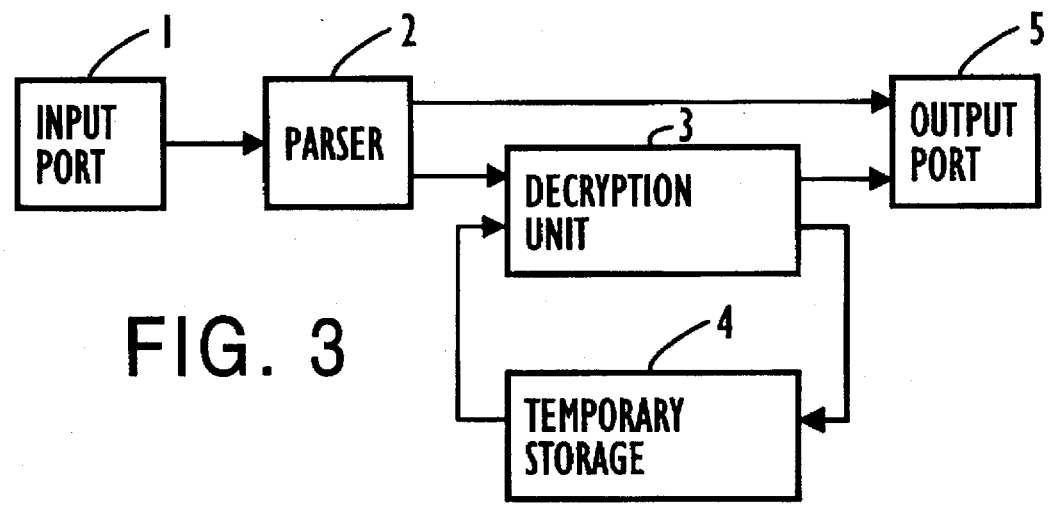
FIG. 3 is a simplified block diagram of an apparatus for decryption using cipher stealing.

A typical decryption subsection of a decoder is shown in FIG. 3. MPEG 2 transport packets arrive from the input port (#1), and are processed by the parser (#2). Certain header bytes and adaptation field bytes (if they exist) are then sent directly to the output port (#5), because they are not encrypted. Also, packets can arrive marked as 'not encrypted', and in that case, the entire packet is sent to the output port without any decryption applied to it.

In the case of an encrypted packet, when the payload section of the packet arrives, the parser waits until at least a full block has arrived. Then parser sends full blocks to the decryption unit (#3) for decryption. The decrypted data is then sent to the output port. This process proceeds block by block for all full blocks of the packet, except for the last full block.

When the parser detects that the number of bytes to be decrypted is an integer multiple of the encryption block size, it sends the last full block to the decryption unit, where it is decrypted and sent to the output port. The decryption of the packet is now complete, and the subsection is ready to decrypt the next packet.

When the parser detects that the number of bytes to be decrypted is not an integer multiple of the encryption block size, it calculates the number of left-over bytes, referred to as P. It then sends the last full block to the decryption unit for a first decryption. The first P bytes from the results of this first decryption are sent to the output port, and the last (B–P) bytes (where B is the decryption block size), are put into temporary storage (#4). Thereafter, the (B–P) bytes in storage and the last P bytes of the encrypted packet are combined and sent to the decryption unit for a second decryption. The result of this second decryption is then sent to the output port, and the subsection is ready to process the next encrypted packet.

Figure 4:
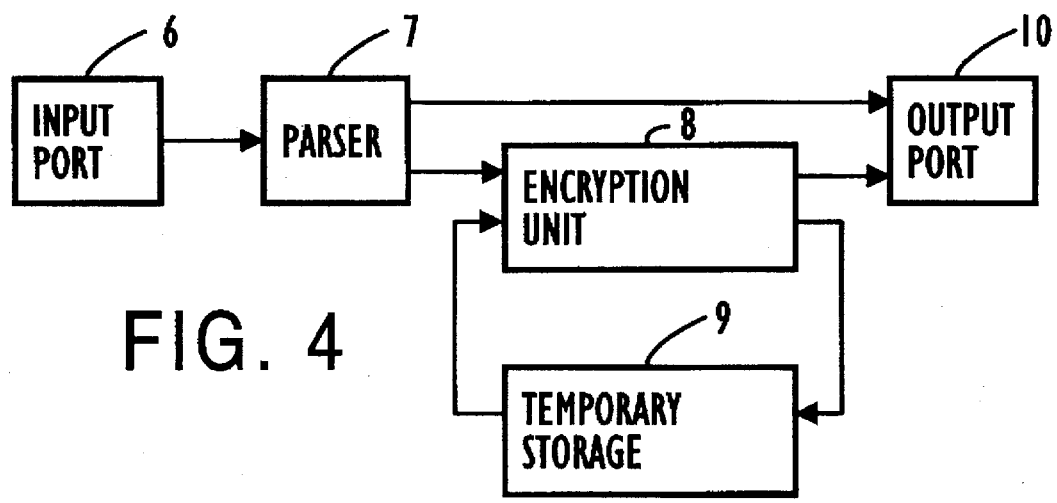
FIG. 4 is a simplified block diagram of an apparatus for encryption using cipher stealing.

The corresponding encryption subsection (FIG. 4) is similar.

Having described preferred embodiments of a novel apparatus and method for cipher stealing when scrambling MPEG transport packets (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A method of broadcasting data by encrypting clear payload data to form encrypted payload data using a block cipher, the block cipher being characterized by a predetermined block length, the clear payload data including a first number of bits, the first number of bits being different than an integer multiple of the predetermined block length, the method comprising steps of:

parsing the clear payload data into a last full clear block and a residual block, the last full clear block being characterized by the predetermined block length, the residual block being characterized by a residual block length, the residual block length being less than the predetermined block length, the step of parsing further parsing the last full clear block into a first part and a second part, the first part being equal in length to the residual block length, the second part being equal in length to a difference between the predetermined block length and the residual block length;

encrypting a combination of the second part and the residual block to form a first encrypted block, the first encrypted block having a third part and a fourth part, the third part being equal in length to the second part length, the fourth part being equal in length to the residual block length;

encrypting a combination of the first part and the third part to form a second encrypted block; and combining the second encrypted block and the fourth part to form the encrypted payload data.

2. A method of receiving broadcast data by decrypting encrypted payload data to recover clear payload data using a block cipher, the block cipher being characterized by a predetermined block length, the encrypted payload data including a first number of bits, the first number of bits being different than an integer multiple of the predetermined block length, the method comprising steps of:

parsing the encrypted payload data into a last full encrypted block and a remaining block, the last full encrypted block being characterized by the predetermined block length, the remaining block being characterized by a remaining block length, the remaining block length being less than the predetermined block length;

decrypting the last full encrypted block to form a last full decrypted block, the last full decrypted block having a first part and a second part, the first part being equal in length to the remaining block length, the second part being equal in length to a difference between the predetermined block length and the residual block length;

decrypting a combination of the second part and the remaining block to form a second decrypted block, the second decrypted block including a third part and a fourth part;

combining the first part and the third part and the fourth part to recover the clear payload data.

3. A method of broadcasting clear payload data using a block cipher, the block cipher being characterized by a predetermined block length, the clear payload data including a first number of bits, the first number of bits being different than an integer multiple of the predetermined block length, the method comprising steps of:

parsing the clear payload data into a last full clear block and a residual block, the last full clear block being characterized by the predetermined block length, the residual block being characterized by a residual block length, the residual block length being less than the predetermined block length, the step of parsing further parsing the last full clear block into a first part and a second part, the first part being equal in length to the residual block length, the second part being equal in length to a difference between the predetermined block length and the residual block length;

encrypting a combination of the second part and the residual block to form a first encrypted block, the first encrypted block having a third part and a fourth part, the third part being equal in length to the second part length, the fourth part being equal in length to the residual block length;

encrypting a combination of the first part and the third part to form a second encrypted block;

combining the second encrypted block and the fourth part to form encrypted payload data;

parsing the encrypted payload data into a last full encrypted block and a remaining block, the last full encrypted block being characterized by the predetermined block length, the remaining block being characterized by a remaining block length, the remaining block length being less than the predetermined block length;

decrypting the last full encrypted block to form a last full decrypted block, the last full decrypted block having a fifth part and a sixth part, the fifth part being equal in length to the remaining block length, the sixth part being equal in length to a difference between the predetermined block length and the remaining block length;

decrypting a combination of the sixth part and the remaining block to form a second decrypted block; and combining the first part and the second decrypted block to recover the clear payload data.

4. The method of claim 3, wherein the remaining block length equals the residual block length.

5. An encryption system with an input port to receive clear data and an output port to provide encrypted data, the system comprising:

a memory;

a parser coupled to the input port to parse the clear data into a last full block having a predetermined block length and a residual block having a residual block length, the residual block length being less than the predetermined block length, the last full block having first and second parts, the first part having a length equal to the residual block length; and a block encryption unit to store the first part in the memory and form a first encryption result from a combination of the second part and the residual block, the first encryption result having third and fourth parts, the fourth part having a length equal to the residual block length, the block encryption unit storing the fourth part in the memory and forming a second encryption result from a combination of the first part retrieved from the memory and the third part, the second encryption result being provided at the output port as encrypted data, the fourth part retrieved from the memory being provided at the output port as encrypted data after the second encryption result is provided at the output port.

6. A decryption system with an input port to receive encrypted data and an output port to provide clear data, the system comprising:

a memory;

a parser coupled to the input port to parse the encrypted data into a last full block having a predetermined block length and a residual block having a residual block length, the residual block length being less than the predetermined block length; and a block decryption unit to form a first decryption result from the last full block, the first decryption result having first and second parts, the second part being stored in the memory, the first part having a length equal to the residual block length and being provided at the output port as clear data, the block decryption unit further forming a second decryption result from a combination of the second part retrieved from the memory and the remaining block, the second decryption result having third and fourth parts, the fourth part having a length equal to the residual block length, the second decryption result being provided at the output port as clear data after the first part is provided at the output port.

7. A communication system comprising an encryption system and a decryption system, wherein:

the encryption system has an encryption input port to receive clear data and an encryption output port to provide encrypted data;

the encryption system further includes a parser coupled to the encryption input port to parse the clear data into a last full block having a predetermined block length and a residual block having a residual block length, the residual block length being less than the predetermined block length, the last full block having first and second parts, the first part having a length equal to the residual block length;

the encryption system further includes a first memory;

the encryption system further includes a block encryption unit to store the first part in the first memory and form a first encryption result from a combination of the second part and the residual block, the first encryption result having third and fourth parts, the fourth part having a length equal to the residual block length, the block encryption unit storing the fourth part in the first memory and forming a second encryption result from a combination of the first part retrieved from the first memory and the third part, the second encryption result being provided at the encryption output port as encrypted data, the fourth part retrieved from the first memory being provided at the encryption output port as encrypted data after the second encryption result is provided at the encryption output port;

the decryption system having a decryption input port to receive encrypted data and a decryption output port to provide recovered clear data;

the decryption system further including a second memory;

the decryption system further including a parser coupled to the decryption input port to parse the encrypted data into a last full encrypted block having the predetermined block length and a remaining block having a remaining block length, the remaining block length being less than the predetermined block length; and a block decryption unit to form a first decryption result from the last full encrypted block, the first decryption result having fifth and sixth parts, the sixth part being stored in the second memory, the fifth part having a length equal to the remaining block length and being provided at the decryption output port as recovered clear data, the block decryption unit further forming a second decryption result from a combination of the sixth part retrieved from the second memory and the remaining block, the second decryption result having seventh and eighth parts, the eighth part having a length equal to the remaining block length, the second decryption result being provided at the decryption output port as recovered clear data after the fifth part is provided at the decryption output port.

8. The system of claim 7, wherein the remaining block length equals the residual block length.

* * * * *